Dec. 25, 1923. Re. 15,736

W. B. KERRICK

WHEEL

Original Filed April 14, 1919 3 Sheets-Sheet 1

Inventor,
Walter B. Kerrick.

By R. S. Berry
Attorney

Dec. 25, 1923. Re. 15,736

W. B. KERRICK

WHEEL

Original Filed April 14, 1919 3 Sheets-Sheet 2

Inventor
Walter B. Kerrick,

R. S. Berry,
Attorney

Dec. 25, 1923. Re. 15,736

W. B. KERRICK

WHEEL

Original Filed April 14, 1919 3 Sheets-Sheet 3

Inventor,

Walter B. Kerrick.

By R. S. Barry

Attorney.

Reissued Dec. 25, 1923.

Re. 15,736

UNITED STATES PATENT OFFICE.

WALTER B. KERRICK, OF LOS ANGELES, CALIFORNIA.

WHEEL.

Original No. 1,377,353, dated May 10, 1921, Serial No. 289,964, filed April 14, 1919. Application for reissue filed November 22, 1921. Serial No. 517,146.

*To all whom it may concern:*

Be it known that I, WALTER B. KERRICK, a citizen of the United States, residing at Los Angeles, in the county of Los Angeles and State of California, have invented a new and useful Improvement in a Wheel, of which the following is a specification.

This invention relates to a wheel, and particularly pertains to a spring-wheel of that class in which inner and outer portions of the wheel are resiliently connected together by a series of horizontally disposed and laterally extending spiral springs.

It is the object of this invention to provide a construction in a wheel of the above character whereby the inner and outer wheel portions may have universal movement relative to each other substantially without wearing friction other than molecular friction in the connections between the inner and outer wheel portions.

Another object is to provide a construction whereby a spiral spring may be rigidly and detachably engaged at both its ends throughout the major portion of its end coils to obviate frictional wear and loose connections between the spring and its mounting.

Another object is to provide a means for engaging an intermediate coil of a spiral spring throughout the major portion of its length to rigidly support the spiral spring intermediate its ends and yet permit independent movement of the portions of the spiral spring on opposite sides of its rigidly mounted central portion without friction between the spring and its mounting.

Another object is to provide means adapted on assembling the wheel to place a series of spiral springs under tension.

Other objects will appear hereinafter.

The invention is illustrated in the accompanying drawings in which.

Figure 1:
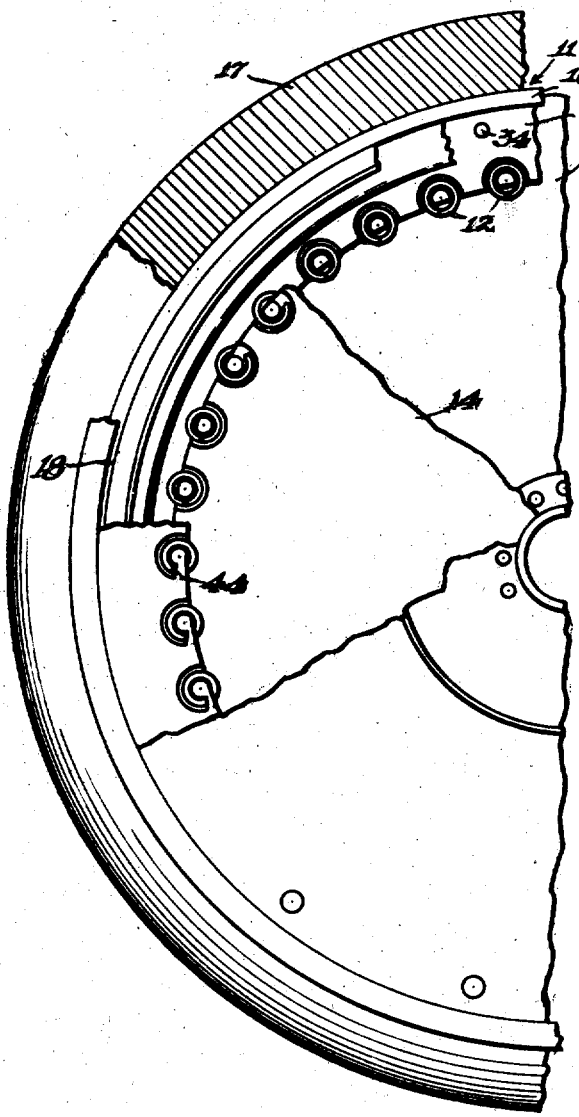
Fig. 1 is a fragmentary view in side elevation with parts broken away showing a vehicle wheel constructed in accordance with this invention.
Figure 2:
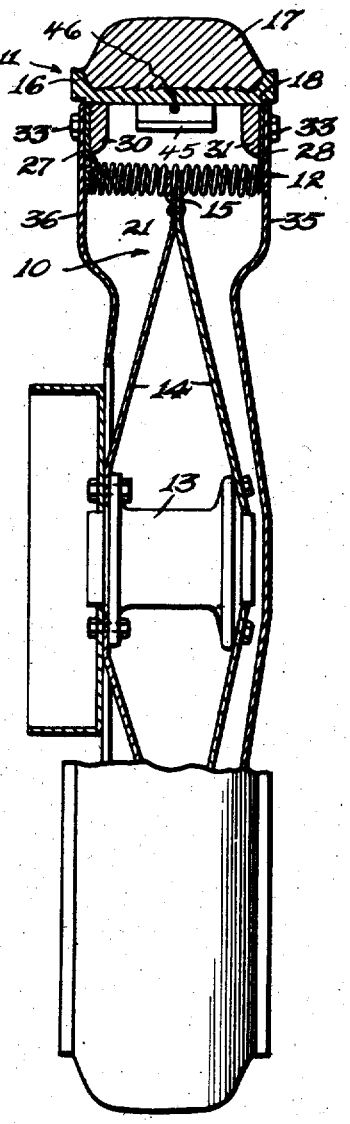
Fig. 2 is a view of the vehicle wheel as seen in end elevation and partly in vertical section.

I have here shown my invention as applied to a vehicle wheel for the purpose of illustrating the preferred embodiment thereof, which wheel consists in a broad sense of an inner wheel portion indicated at 10, an outer wheel portion 11, and a series of horizontally disposed and transversely extending spiral springs 12 interposed between said inner and outer wheel portions. The inner and outer wheel portions may be of any suitable construction according to the use to which the wheel is to be put without affecting the spirit of this invention, as my present invention primarily resides in the manner of mounting the spiral springs rather than in any particular form of the inner and outer wheel members other than the immediate spring engaging members and their supports and adjustments.

However, the inner wheel is here shown as comprising a suitable hub 13 fitted with a pair of disks 14 serving as spokes constituting a support for an inner annular rim member 15 here shown as formed integral with the disks 14, but which may obviously be formed separate and affixed to the hub in any desired manner.

The outer wheel portion is here shown as comprising a felly 16 on which a cushion tire 17 is mounted, this felly being formed with shoulders 18 on the inner marginal edges of its side faces to form abutments, the purpose of which will appear hereinafter. The outer wheel portion is designed to encircle the inner wheel portion in spaced relation thereto.

Figure 9:
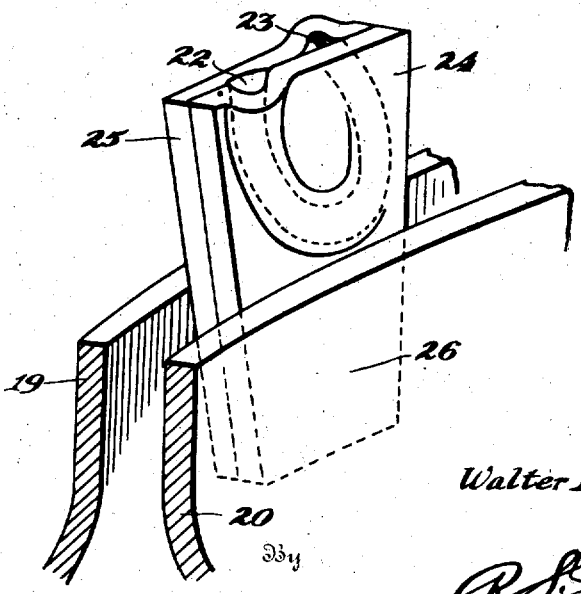
Fig. 9 is a detail in perspective illustrating a modified form of the intermediate coil engaging member.

In carrying out the embodiment of my invention as shown in Figs. 2, 3, 4, and 7, the inner rim member 15 consists of a pair of annular plate portions designated as 19 and 20 contacting face to face and held together by rivets 21 or other suitable fastenings. The plates 19 and 20 are formed at intervals throughout their peripheral edges with opposed substantially semi-circular or arcuate channels 22 and 23 as particularly shown in Fig. 4, the ends of which channels open at the edges of the plates. These channels form a seat for an intermediate coil of a spiral spring 12 designed to be disposed between the plates and rigidly secured thereto on clamping the plates together on opposite sides of the coil by the fastening 21. If desired, for facilitating removal of the spring, the plates may consist of separate arcuate portions as indicated at 24 and 25 in Fig. 9 and secured to the rim 15 by rivets 26 or other suitable fastenings.

Figure 3:
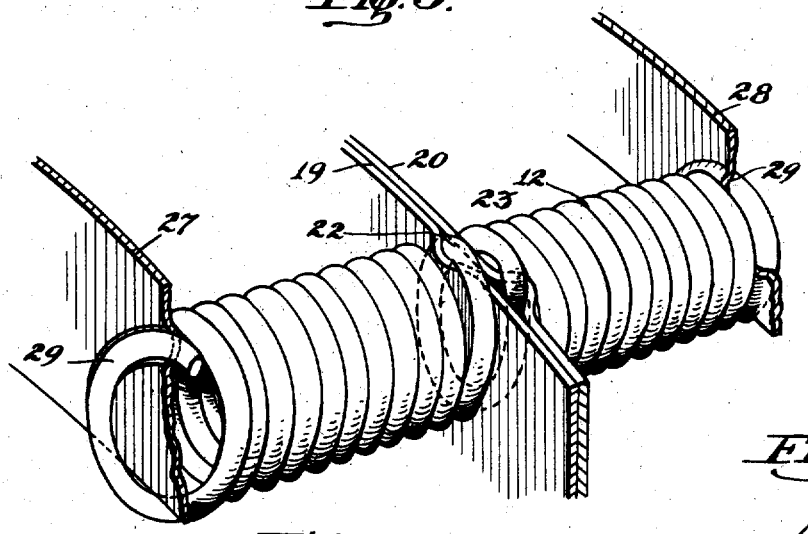
Fig. 3 is a detail in perspective illustrating the manner of mounting the spiral springs.
Figure 6:
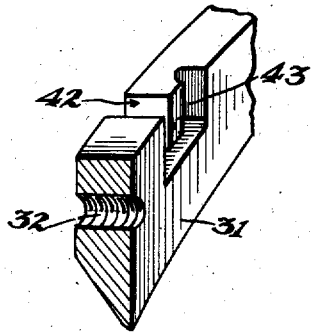
Fig. 6 is a detail section in perspective showing a portion of the spring tensioning annulus.
Figure 4:
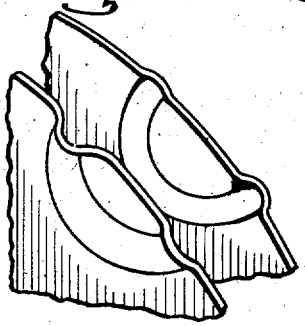
Fig. 4 is a detail in perspective showing the manner of forming the intermediate coil engaging member.
Figure 5:
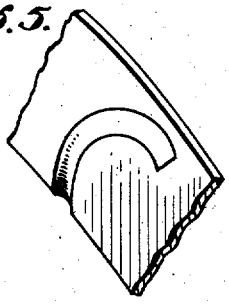
Fig. 5 is a detail in perspective illustrating the manner of forming the end coil engaging member.
Figure 7:
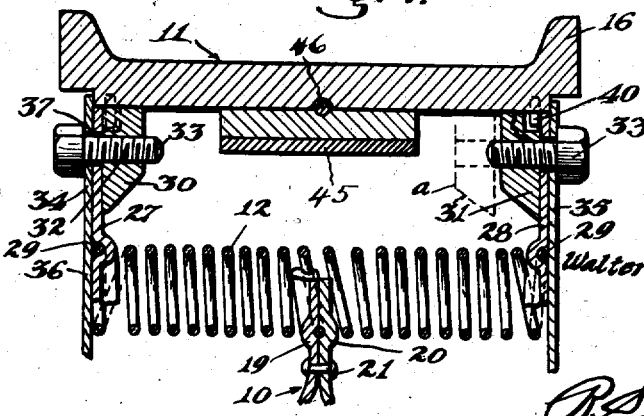
Fig. 7 is a detail in section illustrating the manner of mounting a transverse spiral spring between the inner and outer wheel portions.

The spring end engaging means is here shown as consisting of a pair of sheet metal rings 27 and 28, each of which is formed with arcuate channels 29 on its outer face, having an end opening to the inner marginal edge of the ring as particularly shown in Fig. 5; these channels being arranged opposite the channels 22 and 23 on the inner rim member and adapted to receive the outer coils of the spring as shown in Figs. 3 and 7.

In attaching the outer ends of the spring to the outer wheel portion a pair of loose rings 30 and 31 are provided, which rings have such outside diameter as to slidably engage the inside of the rim 16, and are formed with threaded side openings 32 to receive bolts 33, as will presently be described. The rings 27 and 28 are of an outside diameter less than the inside diameter of the rim 16 and have openings 34 adapted to register with the openings 32 in the rings 30 and 31; the rings 30 and 31 being disposed against the inner faces of the rings 27 and 28 and within the rim 16. Side plates 35 and 36 are adapted to be positioned on the outer faces of the wheel rim with the edges of the plates seating on the shoulders 18 to space the plates apart on opposite sides of the inner wheel portion. These side plates are formed with openings 37 through which the bolts 33 extend; the bolts 33 being passed through the plates 35 and 36, outer rings 27 and 28 and engaged with the inner rings 30 and 31 which, when the springs 12 are in their normally contracted position, will be disposed in spaced relation to the side plates as indicated by the dotted lines A in Fig. 7. On tightening the bolts by screwing them into the threaded openings in the rings 30 and 31 the heads of the bolts will engage the side plates so that on advancing the bolts into the inner rings 30 and 31, the latter will be caused to move outwardly in a position against the inner faces of the side plates, thus placing the springs 12 under tension throughout the wheel. The springs will thus exert an inward pull on the side plates in opposite directions to normally maintain the outer wheel portion in concentric and alined relation to the inner wheel portion and, being under tension, will operate to yieldably oppose movement of the inner and outer portions of the wheel in relation to each other. The spiral springs extending horizontally and axially of the wheel, will permit, though yieldably oppose movement of the outer and inner wheel portions in relation to each other in every direction, thus affording resilient universal movement of the wheel portions.

An important feature of the invention resides in rigidly and securely gripping the coils of the spring at their points of engagement with the inner and outer wheel portions, as by this construction wearing friction between the springs and their fastenings is prevented and frictional wear on the springs is reduced solely to molecular friction.

Figure 8:
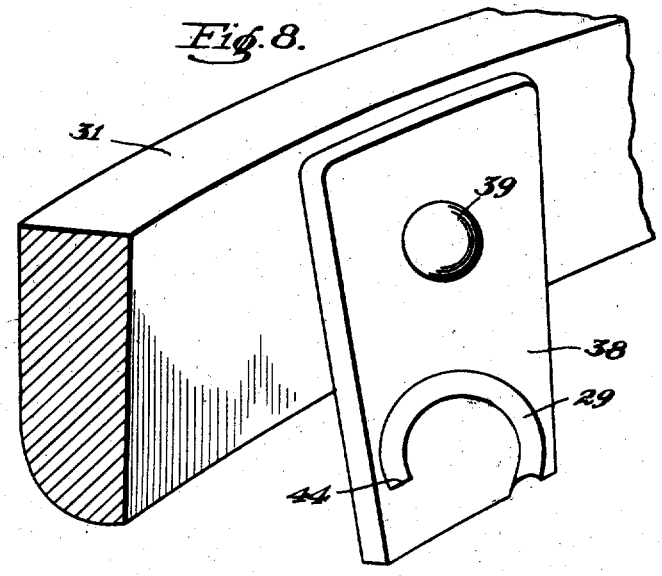
Fig. 8 is a detail in perspective showing modified form of the intermediate coil engaging member.

If desired, the end fastenings of the springs may consist of a series of separate plates 38 instead of continuous rings 27 and 28, which may be secured directly to the rings 30 and 31 by means of rivets 39, or other suitable fastenings, as shown in Fig. 8.

As a means for preventing outward displacement of the side plates, a series of studs 40 are mounted on the inner face of the outer rim 15 adjacent to the edges thereof in such position as to engage the outer faces of the rings 30; the rings 27, 28 and 30 being formed with edge slots 42 through which the studs may pass when positioning the rings within the outer rim, and formed on the outer faces of the rings 30 are notches 43 adapted to engage the studs to hold the rings 30 against peripheral movement.

It is desirable that the springs 12 be held against turning movement relative to their supporting members, and for this purpose the channels 29 in the rings 27 and 28 are terminated to form shoulders 44 as shown in Fig. 5 against which the ends of the springs abut.

From the foregoing it will be seen that when the springs 12 are arranged in the inner member with the major portion of an intermediate coil clamped between the engaging members 23 and 24 and with their terminal coils clamped between the rings 27 and 28 and the outer plates 35 and 36 with the ends of the springs abutting against the shoulders 44 in the channels 29, they will be rigidly held against turning movement at their points of connection, thus obviating frictional wear between the springs and their supporting members. A substantial connection is thus effected between the inner and outer wheel members by which positioning of these members relative to each other is insured and lost motion between the inner and outer wheel members and between the springs and their connections is prevented. By employing the loose rings 30 and 31 with means for connecting the terminals of the springs relative thereto and providing means whereby the rings may be advanced or retracted relative to each other in engaging and disengaging the rings from the outer member the parts are adapted to be readily assembled and dismantled as occasion may require.

As a means for limiting diametrical movement of the inner and outer wheel portions in relation to each other and for the purpose of absorbing shock in event such limit of movement should occur, an annular bumper 45 is mounted on the inner periphery of the outer wheel member and is formed of rubber or other resilient material. This bumper is held in place by a split spring ring 46 adapted to expand into a channel formed in the outer wheel member to hold the bumper in place.

While I have shown and described a specific embodiment of my invention it is manifest that various changes may be made in the details of construction without departing from the spirit and scope of the invention as set forth in the appended claims.

I claim:

1. In a wheel, an inner member and an outer member including a rim, a series of spiral springs having their intermediate portions rigidly affixed to the inner member and their end portions rigidly affixed to the outer member, said springs arranged to extend substantially parallel with the axis of said inner member, and means embodied in the connection between the ends of said springs and the outer member for collectively demountably attaching and detaching the springs relative to the rim to permit removal and replacement of the rim without separately disengaging the springs.

2. In a wheel, an inner member and an outer member including a rim, a series of spiral springs having their intermediate portions rigidly gripped by said inner member to dispose the end portions of the springs on opposite sides of the inner member substantially parallel with the axis thereof and with their terminals rigidly affixed to said outer member, and means embodied in the connection between said springs and the outer member for collectively affecting tension of said springs and whereby the rim may be removed and replaced without separately disengaging the spring.

3. In a wheel, an inner member, a tread annulus, a series of spiral springs projecting from the sides of said inner member and means for detachably connecting the outer ends of said springs collectively to said tread annulus and screw means adapted to place said springs collectively under tension and whereby said springs will exert opposed inward pulls on said tread annulus toward said body member.

4. In a wheel, a pair of joined plates, a spiral spring having a coil intermediate its end engaged throughout the surface thereof between said plates, members to which the end of said springs are removably attached and an annulus to which said members are demountably connected.

5. In a wheel, an inner member and an outer member, a series of spiral springs extending between said members, and means for detachably connecting said springs to said inner and outer members rigidly and immovably engaging a substantial portion of coils of said springs in the direction of their length both circumferentially and laterally.

6. In a wheel, an inner member, an outer member, a series of spiral springs extending horizontally on opposite sides of said inner member, a demountable ring engageable with the ends of said springs on one side of the inner member, a second ring engageable with the ends of said springs on the other side of said inner members, and means for connecting said rings to said outer member adapted to place said springs under tension.

7. In a wheel, an inner member and an outer member, a ring spaced from each side of the inner member, a series of spaced springs extending horizontally from each side of said inner member, and attached relative to said rings, and screw means acting between said outer member and said rings whereby said rings may be advanced in opposite directions to place said springs in and out of tension collectively.

8. In a wheel, an inner and an outer member, a demountable ring member spaced from each side of said inner member, spiral springs extending between said rings and the inner member, a demountable plate engageable with each side of the member, and screw means adapted to connect said plates and the rings for advancing or retracting said rings and effecting demountable connection between said inner and outer members and placing said rings in and out of tension collectively.

9. In a wheel, an outer member, a pair of spaced flange rings on the inner periphery of said outer member, an inner member having separable flange portions, a series of spiral springs each of which springs has an intermediate spiral engaged throughout its surface between the flanges on said inner member in rigid and detachable connection therewith; said springs having a substantial portion thereof projecting on both sides of said inner member, and having their end coils rigidly and detachably connected directly to the flange rings on said outer member to allow yieldable, universal, and limited movement between said inner and outer members without friction.

10. In a wheel, an inner member and an outer member, a series of spiral springs extending laterally from said inner members, and means detachably engageable with said outer member for rigidly gripping the end spirals of said springs throughout a major portion of their lengths and the surfaces thereof embodying abutments engageable with the end of said springs to hold the springs against turning movement.

11. In a wheel, an outer member and an inner member, a series of spiral springs extending laterally from said inner member, a pair of ring plates having arcuate channels engageable with the end spirals of said springs, said channels having end walls against which the ends of said springs abut, and means cooperating with said rings for detachably connecting said springs to the outer member collectively.

WALTER B. KERRICK.